United States Patent [19]

Cao et al.

[11] Patent Number: 5,020,501
[45] Date of Patent: Jun. 4, 1991

[54] CONTROL SYSTEM FOR AN INTERNAL COMBUSTION ENGINE

[75] Inventors: Chi-Thuan Cao, Korntal; Andreas Erban, Bietigheim-Bissingen; Helmut Janetzke, Schwieberdingen; Henning Cordes, Eberdingen; Alfred Schulz; Wolfgang Matuschek, both of Oberriexingen, all of Fed. Rep. of Germany

[73] Assignee: Robert Bosch GmbH, Stuttgart, Fed. Rep. of Germany

[21] Appl. No.: 551,310

[22] Filed: Jul. 12, 1990

[30] Foreign Application Priority Data

Jul. 13, 1989 [DE] Fed. Rep. of Germany ....... 3923031

[51] Int. Cl.$^5$ ...................... F02D 43/00; F02D 41/16; F02D 41/14; F02P 5/145
[52] U.S. Cl. ..................................... 123/489; 123/339
[58] Field of Search ............... 123/339, 440, 478, 479, 123/480, 488, 489, 589

[56] References Cited

U.S. PATENT DOCUMENTS

| | | | |
|---|---|---|---|
| 4,089,313 | 5/1978 | Asano et al. | 123/489 X |
| 4,127,088 | 11/1978 | Ezoe | 123/479 X |
| 4,178,891 | 12/1979 | Latsch et al. | 123/419 |
| 4,294,216 | 10/1981 | Abo et al. | 123/489 |
| 4,320,729 | 3/1982 | Sawada et al. | 123/479 X |
| 4,408,584 | 10/1983 | Yabuhara et al. | 123/479 X |
| 4,430,979 | 2/1984 | Shikata | 123/479 |
| 4,805,578 | 2/1989 | Kikuchi et al. | 123/339 X |
| 4,864,997 | 9/1989 | Miyachi | 123/339 X |
| 4,945,879 | 8/1990 | Fujimoto et al. | 123/479 |

FOREIGN PATENT DOCUMENTS 0033616 7/1985 European Pat. Off. .

*Primary Examiner*—Willis R. Wolfe
*Attorney, Agent, or Firm*—Walter Ottesen

[57] ABSTRACT

The invention is directed to a control system for an internal combustion engine with reference to air throughput, rotational speed and lambda. In this control system, a decoupling device is provided between open loop and closed loop control signals which act with different speeds. An ignition signal is influenced in dependence upon a lambda-dependent signal via at least one dead time member. In this way, phases having unfavorable opposing influence on control branches of different reaction durations are reduced.

9 Claims, 1 Drawing Sheet

CONTROL SYSTEM FOR AN INTERNAL COMBUSTION ENGINE

FIELD OF THE INVENTION

The invention relates to a control system for an internal combustion engine which includes sensors directed to lambda, rotational speed, airflow in the intake pipe and/or throttle flap angle. The control system also includes means for influencing the airflow, rotational speed and lambda.

BACKGROUND OF THE INVENTION

The technical journal "Automobiltechnische Zeitschrift" (ATZ) 82 (1980) 4 includes an article entitled "Verringerung des Kraftstoffsverbrauchs von Ottomotoren durch elektronische Steuerung von Einspritzung und Zündung". On page 173 of this article, a paragraph 3.5 is directed to the digital engine electronics. In this paragraph, in addition to various lambda values, also the ignition time points can be set to values which are matched with the particular lambda value. FIG. 6 on page 173 shows an ignition characteristic field expanded over intake pipe pressure and rotational speed.

U.S. Pat. No. 4,178,891 relates to a method for controlling the operational performance of an internal combustion engine. A method is disclosed for controlling the smoothness of the operation of an engine and provides that the ignition angle in addition to the change of the fuel/air mixture and/or the quantity of exhaust gas fed back is changed. A combined displacement of the ignition angle, the lambda value or the exhaust gas quantity fed back is proposed in the context of a smoothness control.

European patent 0,033,616 discloses a control system for the idle speed wherein the ignition displacement is displaced in proportion to the deviation between the actual and desired speeds and the air or mixture intervention by means of an integral component based on the actual-desired speed deviation is controlled out.

The cooperative relationship between lambda control and idle speed control has been shown not to be optimal in known systems having lambda control and idle speed control. In principle, the two functions of idle speed control and lambda control operate completely independently of each other. However, since both are coupled via the engine, unpleasant operational conditions can occur because the controllers can also operate against each other in dependence upon operating range. The torque supplied by the engine is a function of lambda. If the lambda value changes, this has an influence on engine speed via the changed torque. Since the speed in idle should be held constant, the engine speed controller must intervene immediately in order to reverse the lambda influence. Accordingly, a poor operation of the engine can result at idle in the presence of unfavorable phase conditions for the two controller interventions.

SUMMARY OF THE INVENTION

In view of the above, it is an object of the invention to provide an apparatus which acts against a negative influence from two different controllers.

With the control system of the invention, mutual negative influences of different controllers are eliminated with the result that a smooth operation is provided. This results from a decoupling between the closed-loop control and/or open-loop control signals acting at different speeds.

An intervention in the ignition initiated by a lambda signal is especially advantageous. This intervention is in the form of a decoupling element and extends through at least one delay component.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
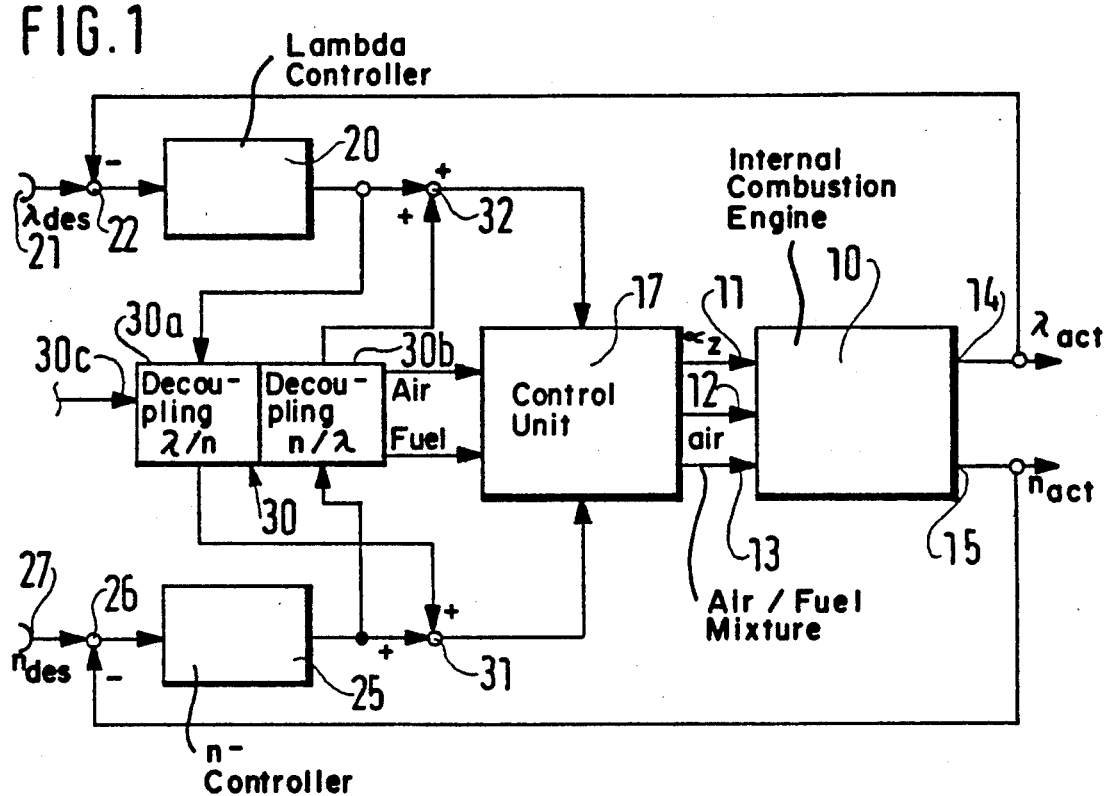
FIG. 1 is a simplified block diagram showing the relationship between a lambda controller and a speed controller; and, FIG. 2 is a specific embodiment showing the relationships for an ignition intervention starting with a lambda signal.

The block diagram of FIG. 1 shows an internal combustion engine having externally supplied ignition with its essential open-loop and closed-loop elements. The engine itself is identified by reference numeral 10. The engine is controlled via an input 11 with respect to ignition, an input 12 with respect to supplied air quantity or air mass and via input 13 with respect to fuel or air/fuel mixture. Only two variables are identified at the output end of the engine. One variable is a lambda actual value at an output 14 and the other variable is the engine speed at output 15. A control unit 17 is connected upstream of the engine 10 and makes air and fuel as well as an ignition signal available to the engine in dependence upon individual parameters and measured variables.

A lambda controller is identified by reference numeral 20 and an engine speed controller by reference numeral 25. A decoupling element is also provided and is identified by reference numeral 30. The electrical elements of the control unit 17, the two controllers 20 and 25 as well as the decoupling element 30 can be assembled into a control apparatus.

The lambda controller 20 influences via a comparison location 22 a control signal for influencing the air/fuel mixture in the sense of a smallest possible lambda-desired-actual deviation. This influence of the lambda controller 20 is dependent upon the lambda actual value at the output 14 of the engine 10 as well as being dependent from a lambda desired signal from an input 21.

The speed controller 25 performs in a corresponding manner. The controller 25 is supplied via a comparison location 26 with the actual speed from the output 15 of the engine 10 as well as with a desired speed from an input 27. This speed controller 25 determines, in turn, a speed performance which is as constant as possible by metering air to the engine 10 or by correspondingly influencing the ignition time point or the lambda value.

The arrangement described above for controlling an engine as such corresponds to the state of the art. According to the invention, a decoupling element 30 is provided in the arrangement of FIG. 1. This decoupling element 30 acts at two ends, that is, on the lambda controller 20 via a decoupling component element 30a on a summation location 31 at the output of the speed controller 25 and in the opposite direction from the output of the speed controller 25 via the decoupling component element 30b to a corresponding summation location 32 at the output of the lambda controller 20.

What is essential in the arrangement of FIG. 1 is that the lambda controller 20 and the speed controller 25 react at different speeds to dynamic operations. This is based on the physics of the internal combustion engine itself. Accordingly, as the ratio of air to fuel is of necessity influenced in the beginning of the combustion process in the engine because the mixture preparation is undertaken in the air intake pipe. For this reason, a certain dead time occurs when influencing by lambda in dependence upon the lambda actual signal with the result of a reaction time which is not negligible. On the other hand, a speed control intervention via the ignition occurs. The reaction time of this intervention is substantially shorter compared to that of the lambda displacement because it influences directly the combustion process in the engine.

If for example in FIG. 1, lambda desired is changed, then the torque supplied by the engine changes correspondingly pursuant to a known relationship. The changed torque, in turn, influences the speed which however is held constant by means of the speed controller. Because of the relatively rapid reaction of the engine on a changed rotational speed controller output signal, measures are taken by means of the decoupling element 30 which prevent an unfavorable coaction of the two controllers 20 and 30 and thereby assure a smooth running. By means of the decoupling element, it is possible to react one-sided or two-sided to changes of the other controller and to consider its influence in the control of the engine. It has been shown advantageous to utilize the means for decoupling only in selective operating ranges especially in idle via a control input 30c.

Figure 2:
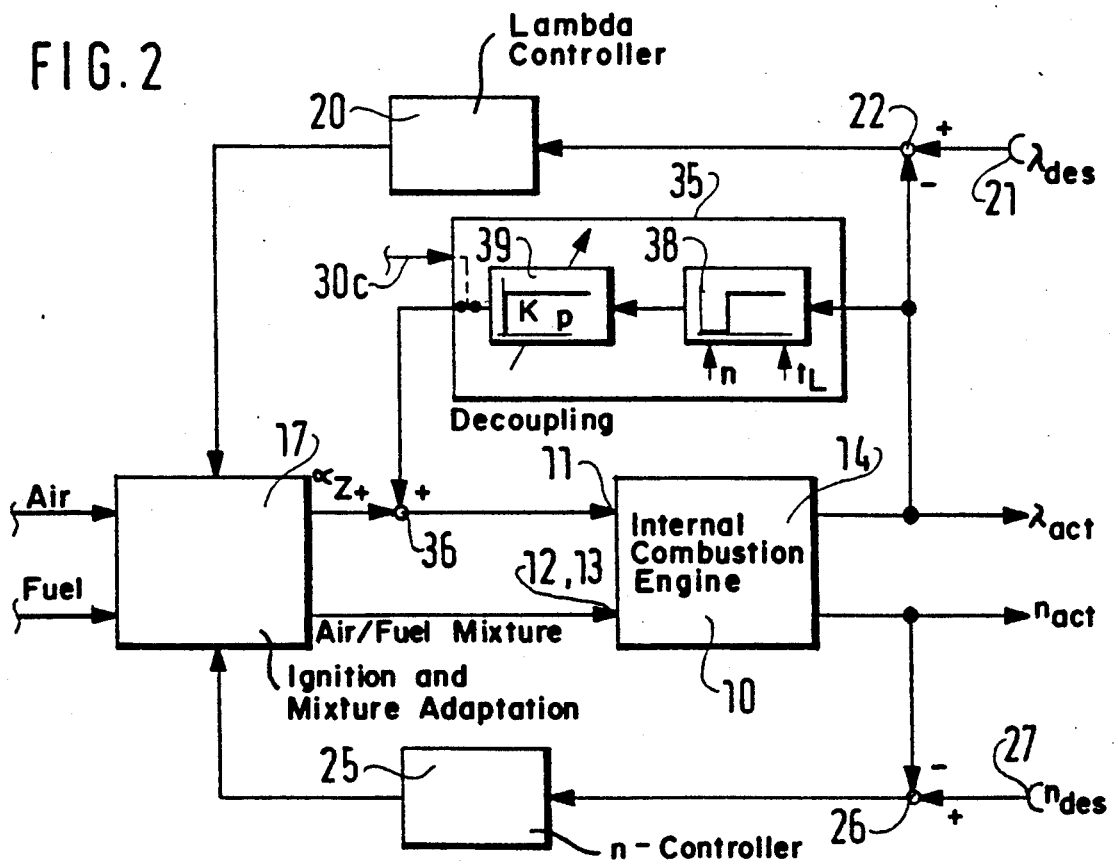

A detailed block diagram for this purpose is shown in FIG. 2. Here the same elements of FIG. 1 are provided with the same reference numerals. In the arrangement of FIG. 2, a decoupling element 35 is disposed between the output 14 of the engine 10 with reference to a lambda actual signal and the input line 11 of the engine for an ignition intervention. This influence is symbolized by means of a summation point 36 ahead of the ignition input 11 of the engine 10. The decoupling element 35 itself comprises a so-called dead time 38 as well as a proportional member 39 connected downstream thereof. Both adjustable variables of dead time member 38 and proportional member 39 are preferably dependent on operating characteristic variables of the engine such as rotational speed and load and are especially dependent on the base injection quantity and on the individual engine type and vehicle type. With this decoupling element 35 of FIG. 2, it is possible to adapt the rapid ignition intervention to the conditions with reference to the mixture composition lambda and in this way obtain a lambda-dependent influencing of the ignition in the sense of a decoupling between the output variables of the two controllers 20 and 25.

As an alternative with respect to the arrangement shown in FIG. 2, it is also possible to charge the input signal of the decoupling element with a lambda desired value or with the output signal of the lambda controller 20 itself.

In addition, the output signal of the decoupling element 35 can be coupled onto the fuel quantity control signal.

The invention is shown in the context of a block diagram in both FIGS. 1 and 2. This block diagram is converted into a control program in modern systems which by means of a computer determines the individual variables to be controlled for the engine 10.

It is understood that the foregoing description is that of the preferred embodiments of the invention and that various changes and modifications may be made thereto without departing from the spirit and scope of the invention as defined in the appended claims.

What is claimed is:

1. A control system for an internal combstion engine, the control system comprising:
   a control unit for supplying signals to the engine indicative of parameters including air and air/fuel mixture;
   a plurality of sensors for sensing respective operating variables of the engine;
   first control means for producing a first control signal for controlling a first one of said operating variables;
   second control means for producing a second control signal for controlling a second one of said operating variables; and,
   decoupling means interposed between said first control means and said control unit and between said second control means and said control unit for decoupling between said first and second control signals acting at different speeds.

2. The control system of claim 1, wherein said decoupling means decouples between lambda control and engine-speed control signals.

3. The control system of claim 1, wherein said coupling means can be switched in in selected operating ranges such as in the idle range.

4. The control system of claim 1, wherein an ignition signal can be influenced in dependence upon a lambda signal.

5. The control system of claim 4, wherein said lambda signal is a lambda-actual signal.

6. The control system of claim 4, wherein the influencing is via a delay member.

7. The control system of claim 6, said delay member being controllable.

8. The control system of claim 7, said delay member being controllable in dependence upon engine speed, load and basic injection quantity (t1).

9. The control system of claim 4, wherein the influencing is via a controllable proportional member.

* * * * *